(12) United States Patent
Suzuki

(10) Patent No.: US 11,027,433 B2
(45) Date of Patent: Jun. 8, 2021

(54) ROBOT SYSTEM AND CONTROL METHOD OF ROBOT SYSTEM FOR TAKING OUT WORKPIECES LOADED IN BULK

(71) Applicant: FANUC CORPORATION, Yamanashi (JP)

(72) Inventor: Tadanori Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 134 days.

(21) Appl. No.: 16/384,923

(22) Filed: Apr. 16, 2019

(65) Prior Publication Data

US 2019/0351557 A1 Nov. 21, 2019

(30) Foreign Application Priority Data

May 18, 2018 (JP) .............................. JP2018-096446

(51) Int. Cl.
*B25J 9/00* (2006.01)
*B25J 9/16* (2006.01)
(Continued)

(52) U.S. Cl.
CPC .............. *B25J 9/1697* (2013.01); *B25J 9/042* (2013.01); *B25J 9/1005* (2013.01); *B25J 9/1612* (2013.01); *B25J 19/023* (2013.01); *G06T 1/0014* (2013.01)

(58) Field of Classification Search
CPC ........ B25J 9/1697; B25J 9/042; B25J 9/1612; B25J 19/023; B25J 9/1005; B25J 15/0033; B25J 15/0608; B25J 9/1602; B25J 9/023; B25J 13/087; B25J 15/08; B25J 15/0246; G06T 1/0014; G06T 7/75
See application file for complete search history.

(56) References Cited

U.S. PATENT DOCUMENTS

2012/0165986 A1 6/2012 Fuhlbrigge et al.
2017/0361464 A1 12/2017 Sasaki
(Continued)

FOREIGN PATENT DOCUMENTS

CN 1699033 A 11/2005
CN 103568014 A 2/2014
(Continued)

*Primary Examiner* — Ian Jen
(74) *Attorney, Agent, or Firm* — Hauptman Ham, LLP

(57) ABSTRACT

A controller includes a generation unit that generates three-dimensional information, a deletion unit that deletes information about at least part of the measurement points in the three-dimensional information, and a determination unit that determines a state where the robot grips a workpiece. The generation unit generates first three-dimensional information before the robot implements an operation of gripping a target workpiece. The generation unit generates second three-dimensional information after the robot has implemented an operation of lifting the target workpiece. The deletion unit generates third three-dimensional information in which information about measurement points in the second three-dimensional information is deleted from the first three-dimensional information. The determination unit determines whether or not the workpiece in the third three-dimensional information matches the target workpiece.

8 Claims, 13 Drawing Sheets

(51) Int. Cl.
*B25J 9/04* (2006.01)
*G06T 1/00* (2006.01)
*B25J 19/02* (2006.01)
*B25J 9/10* (2006.01)

(56) References Cited

U.S. PATENT DOCUMENTS

2018/0085923 A1    3/2018  Nammoto et al.
2018/0126551 A1*   5/2018  Amano ................. B25J 9/1612

FOREIGN PATENT DOCUMENTS

| | | |
|---|---|---|
| CN | 103659838 A | 3/2014 |
| CN | 104608126 A | 5/2015 |
| CN | 104608150 A | 5/2015 |
| CN | 104908043 A | 9/2015 |
| CN | 106493728 A | 3/2017 |
| JP | 2010-69542 A | 4/2010 |
| JP | 2010-120141 A | 6/2010 |
| JP | 201224903 A | 2/2012 |
| JP | 2012240166 A | 12/2012 |
| JP | 2014210311 A | 11/2014 |
| JP | 2015-171749 A | 10/2015 |
| JP | 2016186469 A | 10/2016 |
| JP | 2017-64817 A | 4/2017 |

\* cited by examiner

ROBOT SYSTEM AND CONTROL METHOD OF ROBOT SYSTEM FOR TAKING OUT WORKPIECES LOADED IN BULK

RELATED APPLICATIONS

The present application claims priority of Japanese Application Number 2018-096446, filed May 18, 2018, the disclosure of which is hereby incorporated by reference herein in its entirety.

BACKGROUND OF THE INVENTION

1. Field of the Invention

The present invention relates to a robot system and a control method of a robot system for taking out workpieces loaded in bulk.

2. Description of the Related Art

When many workpieces are contained in a case such as a container, the workpieces may be arranged in a manner in which intervals between the workpieces and orientations of the workpieces are irregular. In other words, the workpieces may be loaded in bulk inside the case. In the technique of related art, a robot system that includes a robot taking out the workpieces from this case is known (for example, Japanese Unexamined Patent Publication No. 2010-69542A).

The workpieces loaded in bulk are contained at various intervals and with various orientations. Accordingly, the workpieces are preferably taken out after a position and an orientation of the workpiece are detected. In the technique of the related art, it is known that a three-dimensional sensor is used for detecting the positions and the orientations of the workpieces (for example, Japanese Unexamined Patent Publication No. 2010-120141A and Japanese Unexamined Patent Publication No. 2017-64817A). In this method, the three-dimensional sensor captures an image of workpieces arranged in the case. The image captured by the three-dimensional sensor can be used for generating information such as a group of three-dimensional points of the workpieces loaded in bulk. Furthermore, the position and the orientation of the workpiece is detected, and the position and the orientation of the robot can be controlled based on the position and the orientation of the workpiece.

A hand having a plurality of craws for clamping the workpiece can be used as an end effector that grips the workpiece. Unfortunately, the hand having the plurality of craws can only grip certain parts of the workpiece, and thus may not be capable of efficiently taking out the workpieces loaded in bulk. For example, a hand that grips a front side of a workpiece may fail to grip a back surface part of the workpiece in a case where the workpiece is flipped upside down. As a result, an operation to take out all the workpieces may fail to be fully accomplished.

Preferably, the end effector is capable of gripping the workpiece in various directions. In other words, preferably, a hand that can grip the workpiece without being setting orientation of the hand relative to the workpiece is used. In the technique of the related art, it is known that a magnetic hand that has a hemispherical tip portion and attracts a workpiece with an electromagnet is used (for example, Japanese Unexamined Patent Publication No. 2015-171749A).

SUMMARY OF THE INVENTION

In a state where workpieces are loaded in bulk in the case, a hand may fail to grip a workpiece when the robot implements an operation of taking out the workpiece from the case. Alternatively, the robot may take out a workpiece different from a desired workpiece. This results in a longer cycle time. For example, when a robot implements an operation of conveying a workpiece to a next step without gripping the workpiece, a time is wasted for implementing an operation for conveying workpiece and an operation for returning to the original position. Thus, preferably, it is checked whether or not the desire workpiece is gripped before the workpiece is gripped by the hand and conveyed to the next step. In other words, a state where the workpiece is gripped is preferably checked.

A device that detects a change in mass may be provided between the wrist and the hand of the robot in order to check the state where the workpiece is gripped (for example, Japanese Unexamined Patent Publication No. 2015-171749A described above). The state where the workpiece is gripped can be checked by measuring the difference between the mass of the hand before the workpiece is gripped and the mass of the hand after the workpiece is gripped. Alternatively, a photoelectric sensor may be attached to the hand or the like. When the workpiece is gripped, light output from the photoelectric sensor is reflected by a surface of the workpiece. When the photoelectric sensor receives the reflected light, the workpiece can be determined to be gripped. However, these methods are disadvantageous in that an additional device for checking the state where the workpiece is gripped is required. Furthermore, the device that detects a change in mass may fail to detect a workpiece with a small mass, in a case where a movement part of the robot involves large friction.

In a case where the hand that can grip a workpiece without setting the orientation of the hand relative to the workpiece is used, the workpiece is gripped by the hand while being in various orientations. This leads to a disadvantage that it is difficult to detect the workpiece with the photoelectric sensor.

For example, a magnetic hand can be employed as the hand and the photoelectric sensor can be employed as a device for detecting the workpiece. A workpiece may be in any orientation relative to the hand when the workpiece is gripped. Thus, the light emitted from the photoelectric sensor may not be reflected depending on the orientation of the workpiece gripped by the hand. In such a case, the hand is determined to be not gripping the workpiece despite the fact that the workpiece is actually being gripped by the hand. Furthermore, when the photoelectric sensor is used, there is a disadvantage that whether a single workpiece is gripped or two or more workpieces are gripped cannot be determined.

A first aspect of the present disclosure is a robot system that takes out each of workpieces loaded in bulk inside a case. The robot system includes a hand that grips workpieces, a robot that moves the hand, a three-dimensional sensor that acquires information about distances to the workpieces, and a controller that controls the hand and the robot. The controller includes an operation control unit that sends operation commands to the hand and the robot, and a generation unit that generates three-dimensional information including information about positions of measurement points set to the workpieces based on an output from the three-dimensional sensor. The controller includes a storage unit that stores three-dimensional shape data of the workpieces and a detection unit that detects positions and orientations of the workpieces by implementing model matching in which the three-dimensional information about the workpieces is compared with the three-dimensional shape data. The controller includes a selection unit that selects a target workpiece to be taken out by the robot based on the positions and the orientations of the workpieces. The controller includes a deletion unit that deletes information about at least part of the measurement points included in the three-dimensional information, and a determination unit that determines a state after the robot implements an operation for lifting the workpiece. The generation unit generates first three-dimensional information based on an output from the three-dimensional sensor that has captured an image of the workpieces before the robot implements an operation of gripping the target workpiece. The operation control unit controls the robot so as to stop after implementing an operation of gripping and lifting the target workpiece selected based on the first three-dimensional information. The generation unit generates second three-dimensional information based on an output from the three-dimensional sensor that has captured an image of the workpieces after the robot implements the operation of lifting the target workpiece. The deletion unit compares a position of the measurement point in the first three-dimensional information with a position of the measurement point in the second three-dimensional information. The deletion unit detects, as a specified measurement point, the measurement point in the first three-dimensional information from which the measurement point in the second three-dimensional information is present within a predetermined distance range. The deletion unit generates third three-dimensional information by deleting information about the specified measurement point from the first three-dimensional information. The detection unit detects a position and an orientation of a workpiece included in the third three-dimensional information. The determination unit determines whether or not the workpiece included in the third three-dimensional information matches the target workpiece. When the workpiece included in the third three-dimensional information matches the target workpiece, the operation control unit controls the robot so as to convey the workpiece gripped by the hand to a predetermined conveyance destination position.

A second aspect of the present disclosure is a control method of a robot system that includes a robot and a hand, and takes out each of workpieces loaded in bulk in a case. The control method includes an operation control step of changing a position and an orientation of the robot. The control method includes an image capturing step of capturing an image of the workpieces with a three-dimensional sensor that acquires information about distances to the workpieces, and a generation step of generating three-dimensional information including information about positions of measurement points set to the workpieces based on an output from the three-dimensional sensor. The control method includes a detection step of detecting the positions and the orientations of the workpieces by implementing model matching in which the three-dimensional information about the workpieces is compared with three-dimensional shape data of the workpieces. The control method includes a selection step of selecting a target workpiece to be taken out by the robot based on the positions and the orientations of the workpieces. The control method includes a deletion step of deleting information about at least part of the measurement points included in the three-dimensional information, and a determination step of determining a state after the robot implements an operation of lifting the workpiece. The generation step includes generating first three-dimensional information based on an output from the three-dimensional sensor that has captured an image of the workpiece before the robot implements an operation of gripping the target workpiece. The operation control step includes a step of controlling the robot so as to stop after implementing an operation of gripping and lifting the target workpiece selected based on the first three-dimensional information. The generation step includes generating second three-dimensional information based on an output from the three-dimensional sensor that has captured an image of the workpieces after the robot has implemented the operation of lifting the target workpiece. The deletion step includes a step of comparing a position of the measurement point in the first three-dimensional information with a position of the measurement point in the second three-dimensional information. The deletion step includes a step of detecting, as a specified measurement point, the measurement point in the first three-dimensional information from which the measurement point in the second three-dimensional information is present within a predetermined distance range. The deletion step includes a step of generating third three-dimensional information by deleting information about the specified measurement point from the first three-dimensional information. The detection step includes a step of detecting a position and an orientation of a workpiece included in the third three-dimensional information. The determination step includes a step of determining whether or not the workpiece included in the third three-dimensional information matches the target workpiece. The operation control step includes a step of controlling, when the workpiece included in the third three-dimensional information matches the target workpiece, the robot so as to convey the workpiece gripped by the hand to a predetermined conveyance destination position.

DETAILED DESCRIPTION

A robot system and a control method of the robot system according to embodiments will be described while referencing FIGS. 1 to 16. The robot system according to the present embodiment implements an operation of taking out workpieces piled up in a case, and conveying the workpieces to a predetermined conveyance destination position.

Figure 1:
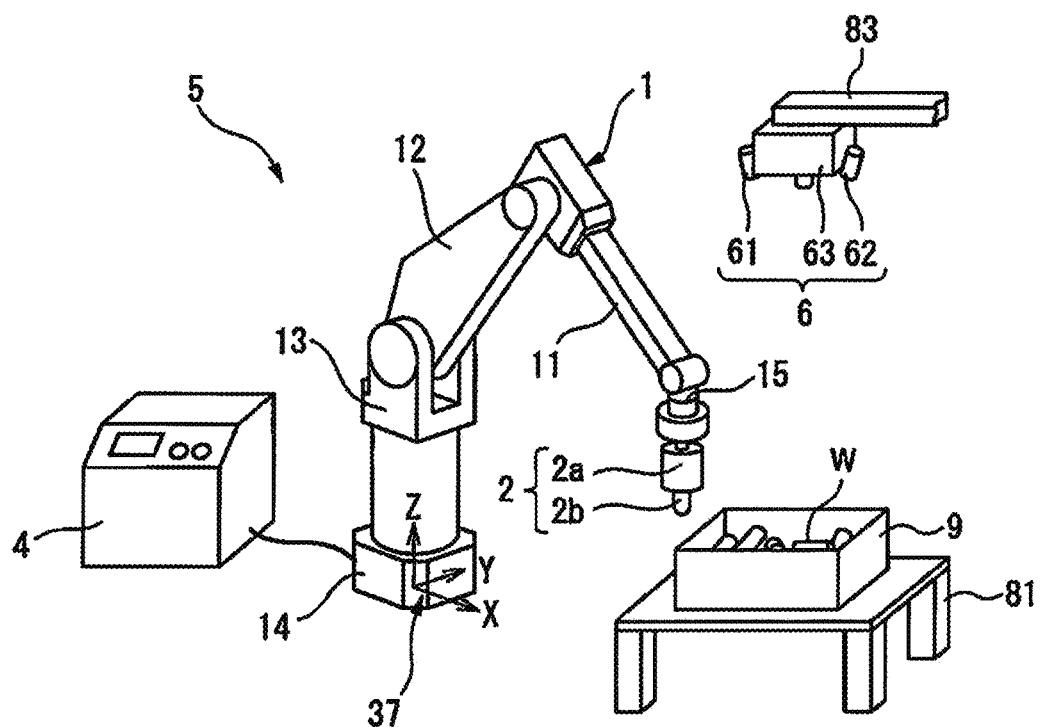
FIG. 1 is a perspective view of a robot system of an embodiment.

FIG. 1 is a perspective view of a robot system of the present embodiment. The robot system 5 includes a robot 1 and a hand 2. The robot system 5 includes a controller 4 that controls the robot 1 and the hand 2. The robot 1 of the present embodiment is an articulated robot having a plurality of joints. The robot 1 includes an upper arm 11 and a lower arm 12. The lower arm 12 is supported by a swivel base 13. The swivel base 13 is supported by a base 14. The robot 1 includes a wrist 15 coupled to an end portion of the upper arm 11. These components of the robot 1 are each formed to rotate about a predetermined rotation axis. Note that the robot is not limited to the mode, and any robot capable of changing the position and the orientation of the hand can be employed.

The hand 2 is an operation tool that grips and releases the workpiece W. The hand 2 includes an electromagnet 2a that produces attraction force by magnetic force and an attraction member 2b that attracts the workpieces W with the magnetic force of the electromagnet 2a. The attraction member 2b is formed to have a rod shape. The attraction member 2b is formed to have a spherical tip portion. The hand 2 of the present embodiment can grip the workpiece W without setting a position and an orientation of the hand 2 relative to the workpiece W.

The workpieces W are arranged inside a container 9 serving as a case. The case may be any member that can accommodate the workpieces W, such as a box, a bag, a basket, or the like. In the container 9, the workpieces W are loaded in bulk. The container 9 is placed on a table 81. The robot system 5 of the present embodiment takes out the workpieces W one by one from the container 9, and conveys the workpieces W to the predetermined conveyance destination position.

The robot system 5 includes a range sensor 6 serving as a three-dimensional sensor for detecting the position and the orientation of the workpiece W. The range sensor 6 acquires information about a distance to the workpiece W. The range sensor 6 is arranged at a position to be capable of capturing an image of the workpiece W. In the present embodiment, the range sensor 6 is arranged above the container 9. The range sensor 6 is fixed to a support member 83. The range sensor 6 is controlled by the controller 4.

The range sensor 6 of the present embodiment is a stereo camera including two cameras 61 and 62. The cameras 61 and 62 are each a two-dimensional camera that can capture a two-dimensional image. The cameras 61 and 62 may be any cameras including image element such as a Charge-Coupled Device (CCD) sensor or a Complementary Metal-Oxide Semiconductor (CMOS) sensor. The relative positions of the two cameras 61 and 62 are determined in advance. The range sensor 6 of the present embodiment includes a projector 63 that projects light in a pattern, such as a stripe pattern, toward the workpieces W.

A reference coordinate system 37 that is immovable in response to a change in the position and the orientation of the robot 1 is set to the robot system 5 of the present embodiment. In the example illustrated in FIG. 1, the reference coordinate system 37 has the origin arranged at the base 14 of the robot 1. The reference coordinate system 37 is also referred to as a world coordinate system. The reference coordinate system 37 has an X axis, a Y axis, and a Z axis set to be orthogonal to each other as coordinate axes. For example, a coordinate value (xb, yb, zb) of the reference coordinate system 37 can be set. Furthermore, W axis serving as coordinate axis around the X axis, P axis serving as coordinate axis around the Y axis, and R axis serving as coordinate axis around the Z axis may be set. In this case, a coordinate value (xb, yb, zb, wb, pb, rb) of the reference coordinate system 37 can be set.

Figure 2:
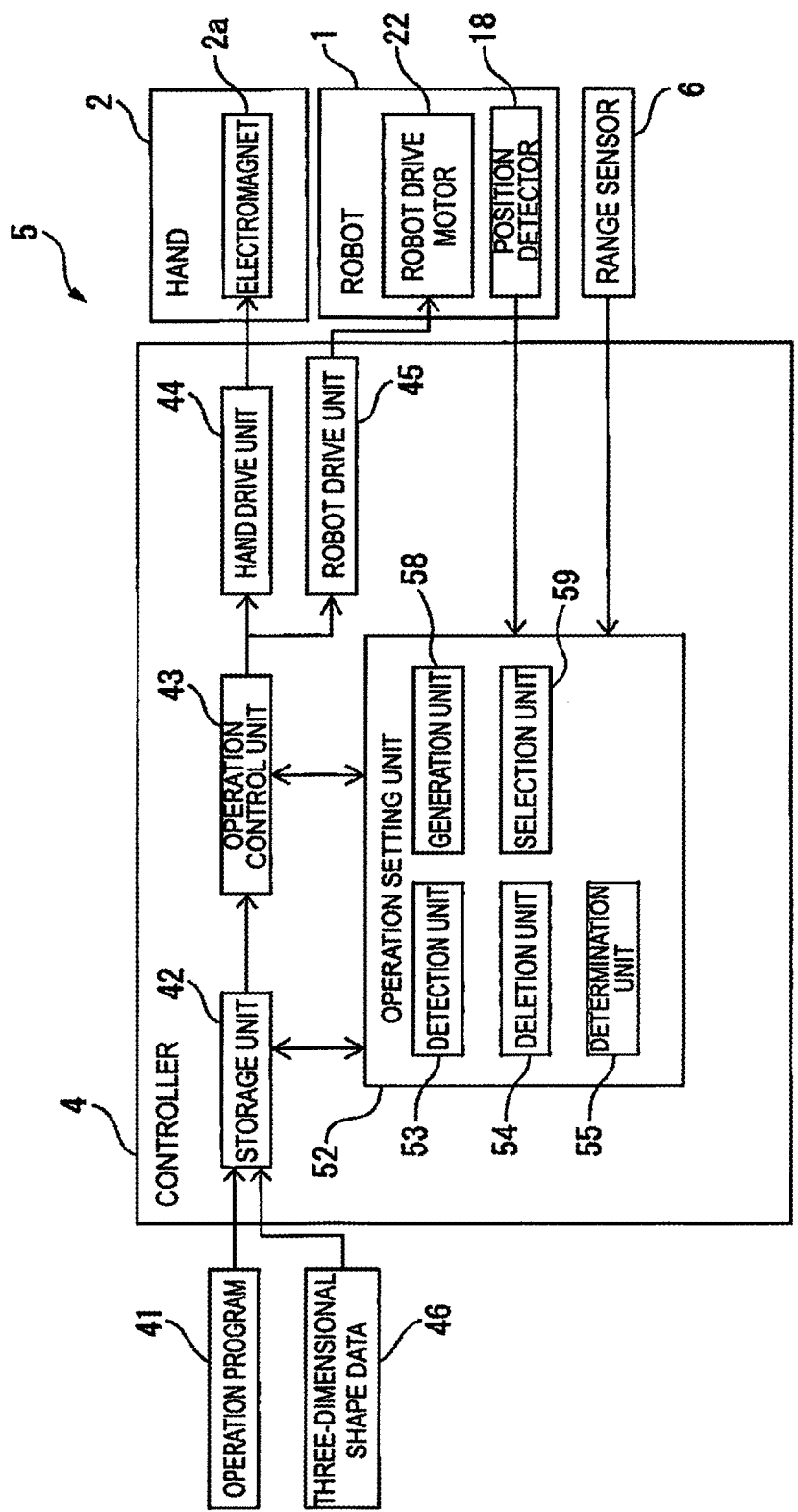
FIG. 2 is a block diagram of the robot system of the embodiment.

FIG. 2 is a block diagram of a robot system of the present embodiment. Referring to FIG. 1 and FIG. 2, the robot 1 includes a robot drive device that changes the position and the orientation of the robot 1. The robot drive device includes robot drive motors 22 that drive components such as an arm and a wrist. By driving the robot drive motor 22, the orientation of each component is changed.

The robot system 5 includes a hand drive device that drives the hand 2. The workpiece W of the present embodiment is formed of a magnetic material such as iron. The workpiece W is attracted to the attraction member 2b when the electromagnet 2a of the hand 2 is driven.

The controller 4 includes an arithmetic processing device (computer) having a Central Processing Unit (CPU), a Random Access Memory (RAM), a Read Only Memory (ROM), or the like connected to the CPU via a bus. An operation program 41 that is generated in advance for operating the robot 1 is input to the controller 4. The operation program 41 is stored in the storage part 42. Furthermore, the storage unit 42 stores information about control such as a determination value and a determination range. The robot system 5 of the present embodiment conveys the workpiece W based on the operation program 41. The robot 1 can automatically convey the workpiece W to a predetermined conveyance destination position.

The operation control unit 43 sends an operation command for driving the robot 1 based on the operation program 41 to a robot drive unit 45. The robot drive unit 45 includes an electric circuit that drives the robot drive motor 22. The robot drive unit 45 supplies electricity based on the operation command to the robot drive motor 22. The operation control unit 43 sends an operation command for driving the hand 2 based on the operation program 41 to a hand drive unit 44. The hand drive unit 44 includes an electric circuit that drives the electromagnet 2a. The hand drive unit 44 supplies electricity to the electromagnet 2a based on the operation command. The operation control unit 43 sends an operation command for driving the range sensor 6 to the range sensor 6 based on the operation program 41.

The robot 1 includes a status detector for detecting the position and the orientation of the robot 1. The status detector of the present embodiment includes a position detector 18 attached to the robot drive motor 22 corresponding to the drive axis of a component such as an arm. The orientation of the component along each drive axis can be acquired from an output from the position detector 18. For example, the position detector 18 detects a rotational angle when the robot drive motor 22 is driven. The position and the orientation of the hand 2 are detected based on an output from the position detector 18.

The controller 4 includes an operation setting unit 52 that sets the operation of the robot 1 based on the operation program 41. The operation setting unit 52 of the present embodiment implements control for selecting the workpiece W to be taken out from the container 9 and gripping the workpiece W with the hand 2. The operation setting unit 52 detects the status of the workpiece W gripped by the hand 2 and controls the operation of the robot 1.

Figure 3:
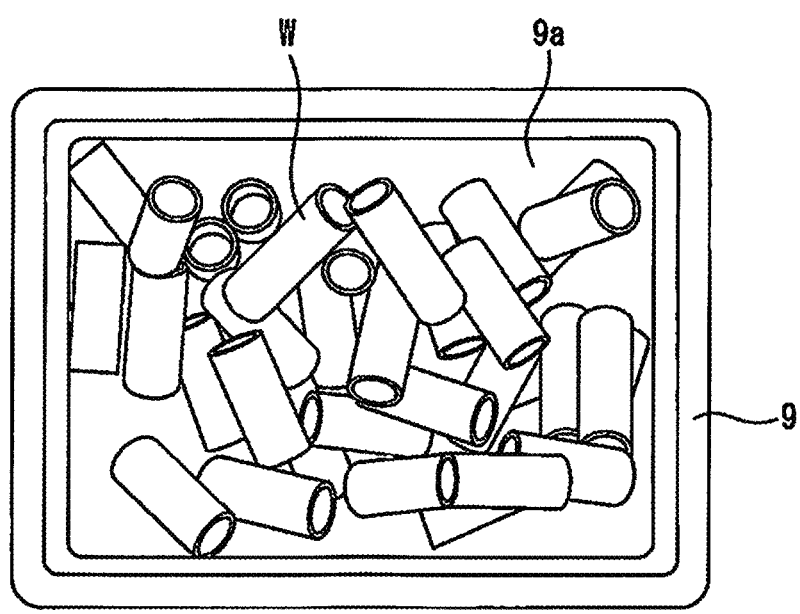
FIG. 3 is a plan view of a container containing workpieces therein.
Figure 4:
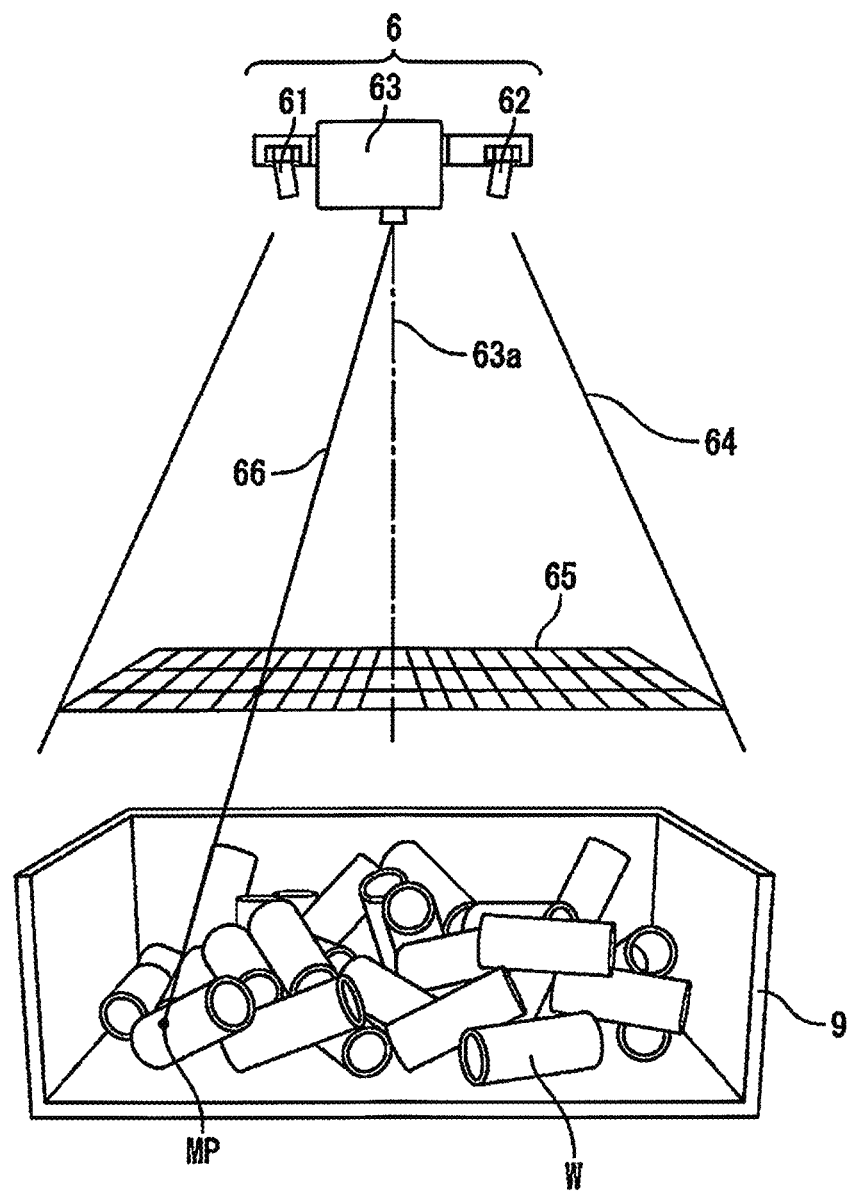
FIG. 4 is a partial cross-sectional view of a range sensor and a container of the embodiment.

FIG. 3 is a plan view of the container containing workpieces therein. FIG. 4 is a partial cross-sectional view illustrating relationship between a range sensor and a workpiece of the present embodiment. In FIG. 4, the range sensor 6 and the container 9 are illustrated to be arranged with a short distance in between for the sake of description. A plurality of the workpieces W are arranged in the container 9. The workpiece W of the present embodiment is formed to have a cylindrical shape. In the present embodiment, a state where the workpieces W are not arranged at an equal distance or in the same orientation in at least one direction of the container 9 is referred to as a state where the workpieces W are loaded in bulk. In the present embodiment, the plurality of the workpieces W are arranged in the container 9 so that axial directions of the workpieces W are different from each other. In other words, the workpieces W are loaded so that a plurality of workpieces W are orientated randomly.

The range sensor 6 has an image capturing range 64 in which an image can be captured. The cameras 61 and 62 are preferably arranged so that the container 9 is placed within the image capturing range 64. In other words, the cameras 61 and 62 are preferably arranged to be capable of capturing an image including all the workpieces W that can be viewed from above the container 9.

Figure 5:
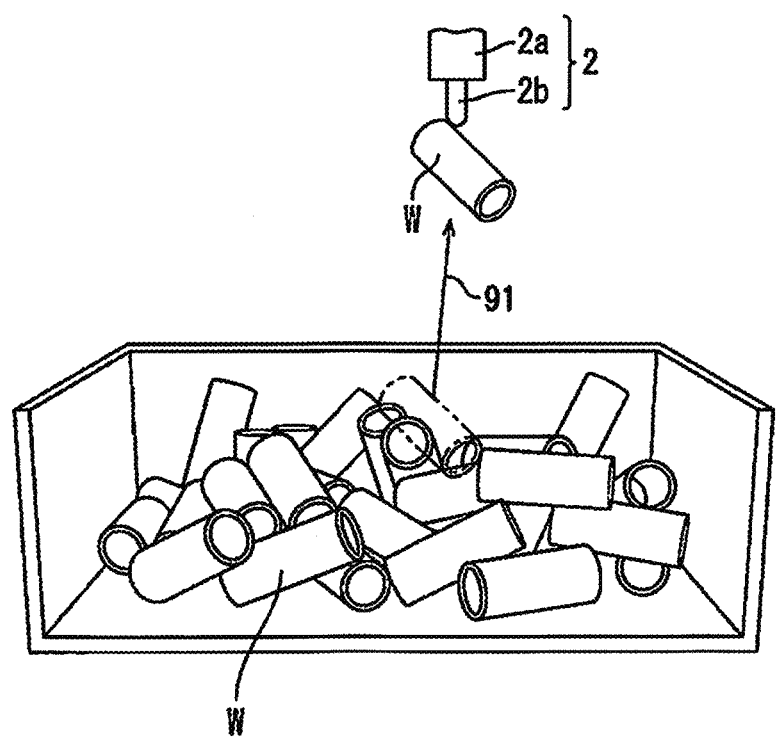
FIG. 5 is a partial cross-sectional view of the container and a workpiece of the present embodiment.

FIG. 5 is a partial cross-sectional view of a hand and a container in an operation of taking out a workpiece. The robot 1 is driven so as to bring the attraction member 2b of the hand 2 into contact with the workpiece W. The electromagnet 2a of the hand 2 is driven, whereby the workpiece W is attracted to the attraction member 2b. The robot 1 is then driven so as to move the hand 2, whereby the workpiece W can be lifted as indicated by an arrow 91. In the present embodiment, the workpiece W is gripped by the hand 2 in a random orientation.

Referring to FIG. 2 and FIG. 4, the controller 4 includes a generation unit 58 that generates three-dimensional information about the workpiece W based on an output from the range sensor 6. The generation unit 58 processes images captured by the cameras 61 and 62. The generation unit 58 can employ stereoscopy so as to generate three-dimensional information about the workpiece W. The three-dimensional information includes information about positions of measurement points set on surfaces of the workpieces W.

Figure 6:
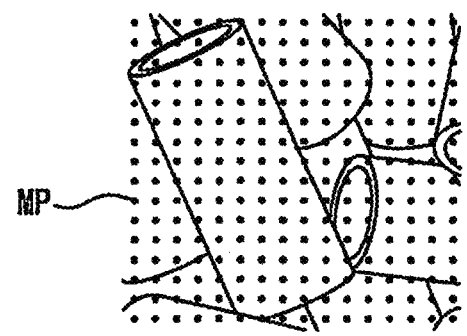
FIG. 6 is a diagram illustrating measurement points set on surfaces of workpieces.

FIG. 6 is a diagram illustrating measurement points set on surfaces of workpieces. The generation unit 58 may employ any method in order to set a plurality of measurement points MP on the surfaces of the workpieces W as viewed from the range sensor 6. For example, referring FIG. 4, the generation unit 58 can set a plane 65 orthogonal to an optical axis 63a of the projector 63. The generation unit 58 can set lines in a lattice form on the plane 65. For example, the generation unit 58 can set straight lines extending in the direction of the X axis and the straight lines extending in the direction of the Y axis that are orthogonal to each other. The generation unit 58 sets a straight line 66 connecting an intersection between these plurality of straight lines and the lens center point of the projector 63 to each other. The generation unit 58 can set the measurement point MP at a point of intersection between the surface of the workpiece W and the direction of the straight line 66.

The generation unit 58 calculates the distance from the range sensor 6 to the measurement point MP based on parallax between two images captured by the two cameras 61 and 62. The generation unit 58 can detect the position of the measurement point MP based on the distance to the measurement point MP and the orientation of the straight line 66. For example, the generation unit 58 can calculate the coordinate value of the measurement point MP in the reference coordinate system 37 and generate three-dimensional information.

The three-dimensional information includes information about the positions of the plurality of measurement points MP. The three-dimensional information of the present embodiment includes the coordinate value of the measurement point MP in the reference coordinate system 37. The three-dimensional information may include information about the distance from the range sensor 6 to the measurement point MP and a direction from the range sensor 6 to the measurement point MP. For example, the three-dimensional information is a distance image or a three-dimensional map. The distance image is an image with a color or density that changes in accordance with the distance from the range sensor 6. The three-dimensional map includes a coordinate value of a measurement point in a predetermined coordinate system or information about the distance and the direction from the range sensor to the measurement point. The generation unit 58 of the present embodiment is included in the controller 4 that controls the robot 1, but the embodiment is not limited to this. An arithmetic processing device that processes the images captured by the cameras 61 and 62 may be provided separately from the controller 4.

Referring to FIG. 2, the detection unit 53 implements model matching in which the three-dimensional information about the workpiece W is compared with the three-dimensional shape data so as to detect the position and the orientation of the workpiece W. In the present embodiment, three-dimensional shape data 46 about the workpiece W generated in advance is stored in the storage unit 42. For example, three-dimensional data of the shape generated by a Computer Aided Design (CAD) device can be used as the three-dimensional shape data 46. The generation unit 58 may detect the orientation of each of the workpieces W based on the three-dimensional shape data 46 generated by the CAD device.

Alternatively, an operator may employ a distance image of a workpiece captured in a predetermined direction as the three-dimensional shape data 46. The operator may employ distance images of a workpiece captured in a plurality of directions for showing largely different shapes of the workpiece, as the three-dimensional shape data 46. For example, the workpiece W of the present embodiment has a cylindrical shape. Thus, the distance image captured in a direction orthogonal to the axis of the workpiece and the distance image of the workpiece W as viewed in the axial direction may be employed as the three-dimensional shape data 46. Even when the direction of viewing the workpiece W is slightly shifted, the detection unit 53 can use such pieces of three-dimensional shape data 46 so as to detect the position and the orientation of the workpiece W.

When a plurality of types of workpieces are arranged in the case, the operator generates the three-dimensional shape data 46 for each type of workpiece. The storage unit 42 can store a plurality of types of three-dimensional shape data 46. The operation setting unit 52 can implement determination on each type of workpiece.

The operation setting unit 52 includes a selection unit 59 that selects a target workpiece W to be picked up by the robot 1. The selection unit 59 selects the target workpiece W based on the positions and the orientations of the workpieces W detected by the detection unit 53. The selection unit 59 may implement any appropriate control in order to select the target workpiece W. For example, the workpiece W closest to the range sensor 6 may be set as the target workpiece W. Thus, the workpiece W at the highest position may be selected one by one. Under a certain condition, the workpiece W at a low position may be selected. For example, the selection unit 59 may select the workpiece W in which a portion to be gripped is exposed largely so as to be easily gripped by the hand 2.

The selection unit 59 may determine whether or not the workpiece W can be gripped by the hand 2. For example, the attraction member 2b of the hand 2 may be unable to be brought into contact with the workpiece W when the workpiece W is close to a wall surface of the container 9. In such a case, the selection unit 59 may determine that the workpiece W cannot be gripped.

The selection unit 59 calculates a target position and a target orientation with which the robot 1 can grip the workpiece W, based on the position and the orientation of the target workpiece W. The selection unit 59 transmits the target position and the target orientation of the robot 1 to the operation control unit 43. The position and the orientation of the robot 1 are changed to the target position and the target orientation. The workpiece W can be gripped with the attraction member 2b of the hand 2 excited after the robot 1 reaches the target position and the target orientation. Then, the operation control unit 43 changes the position and the orientation of the robot 1 so as to implement an operation of lifting the workpiece W.

The operation setting unit 52 includes a determination unit 55 that determines a state after the robot 1 has lifted the workpiece W. The determination unit 55 determines whether or not the workpiece W is lifted in a desired state. When the robot 1 grips the workpiece W in a desired state, the determination unit 55 transmits an operation command for conveying the workpiece to the conveyance destination position to the operation control unit 43. The operation control unit 43 controls the robot 1 so as to convey the workpiece to the conveyance destination position.

When the robot 1 does not grip the workpiece W in the desired state, the determination unit 55 transmits an operation command for returning the workpiece W gripped by the hand 2 to an original position before being gripped by the hand 2, to the operation control unit 43. Alternatively, when it is determined that the hand 2 does not grip the workpiece W, the determination unit 55 transmits an operation command for implementing control from an operation for capturing an image of the workpiece.

Next, control for determining the state where the workpiece is gripped by the determination unit 55 and changing the operation of the robot 1 in accordance with the state where the workpiece W is gripped is described in detail.

Figure 7:
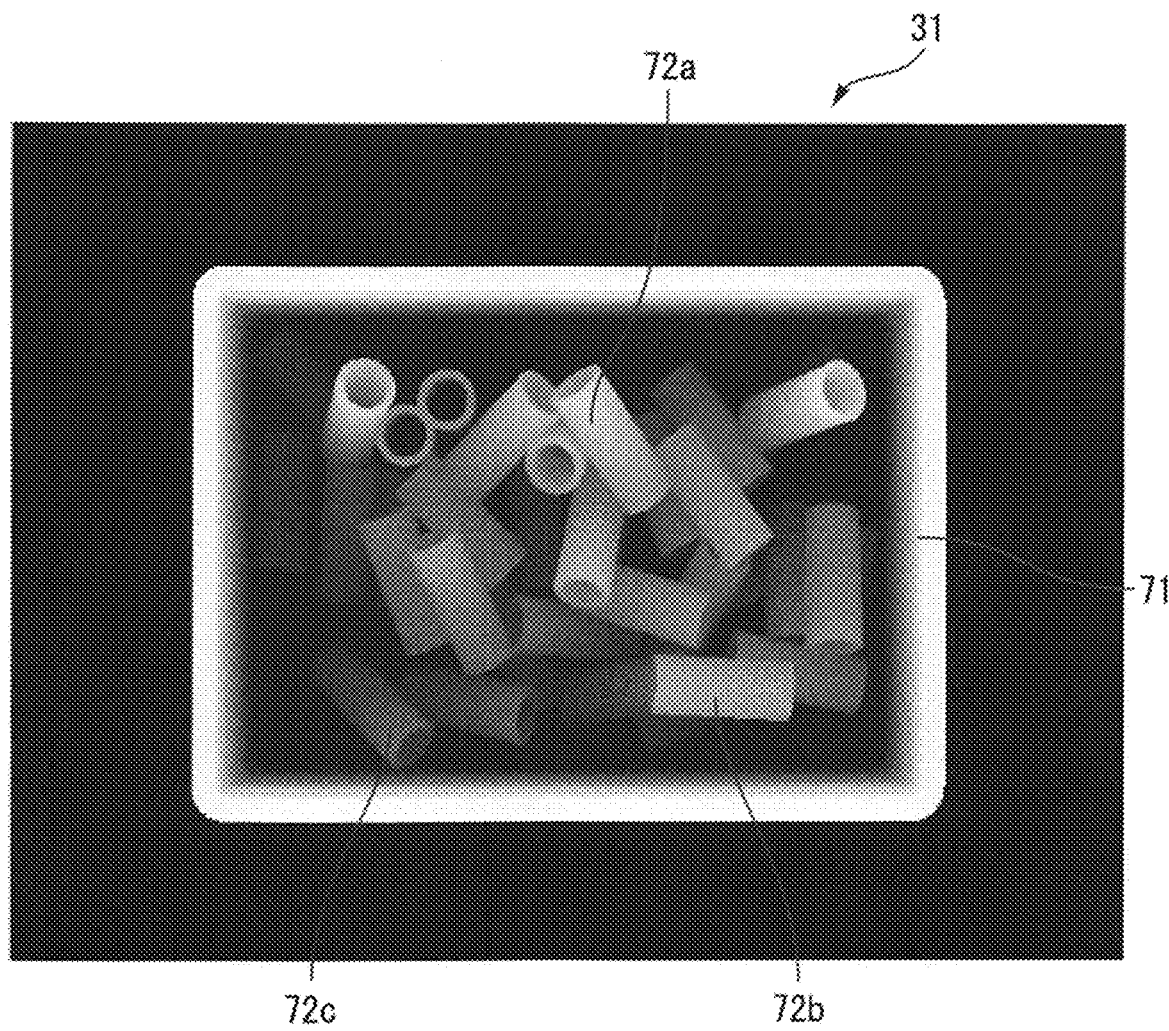
FIG. 7 illustrates a first distance image before a workpiece is taken out.

FIG. 7 shows an example of first three-dimensional information generated by a generation unit. FIG. 7 illustrates a first distance image 31 captured by the range sensor 6 before the robot 1 is driven. In this example, a distance image that has a density varying in accordance with the distance from the range sensor 6 is shown. In this distance image, a part closer to the range sensor 6 is shown with a lower density. The first distance image 31 includes images 72a, 72b, and 72c of a plurality of workpieces and an image 71 of a container.

In the present embodiment, the range sensor 6 captures an image of the workpieces W before the robot 1 implements an operation of gripping the target workpiece W. The generation unit 58 generates the first distance image 31 based on an output from the range sensor 6. The first distance image 31 corresponds to the first three-dimensional information generated based on an output from the range sensor 6 that has captured an image of the workpiece W. The three-dimensional information of the present embodiment includes information about coordinate values of the measurement points MP.

The detection unit 53 detects the position and the orientation of each workpiece W based on the first distance image 31. The selection unit 59 selects the workpiece W to be taken out by the robot 1 based on the positions and the orientations of the workpieces W. The operation control unit 43 controls the robot 1 so as to grip the target workpiece W. The operation control unit 43 controls the robot 1 so as to stop after implementing an operation of lifting the target workpiece W. At this time, the robot 1 takes out the target workpiece W from the container 9 and moves to the outside of an image capturing range 64 of the range sensor 6. In other words, the position and the orientation of the robot 1 are changed so that the robot 1, the hand 2, and the workpiece W gripped by the hand 2 are not included in the distance image to be captured by the range sensor 6. The robot 1 arranges the workpiece W in the vicinity of the container 9, instead of conveying it to the target conveyance destination position.

In this example, the target workpiece W is a workpiece corresponding to the image 72a among the images 72a, 72b, and 72c of the plurality of workpieces. Furthermore, in this example, the robot 1 lifts the target workpiece W only. Thus, the robot 1 does not lift any workpiece W other than the target workpiece.

Next, the range sensor 6 captures an image of the workpieces W arranged in the container 9, after the robot 1 has implemented the operation of lifting the workpiece W. The generation unit 58 generates a second distance image as second three-dimensional information based on an output from the range sensor 6.

Figure 8:
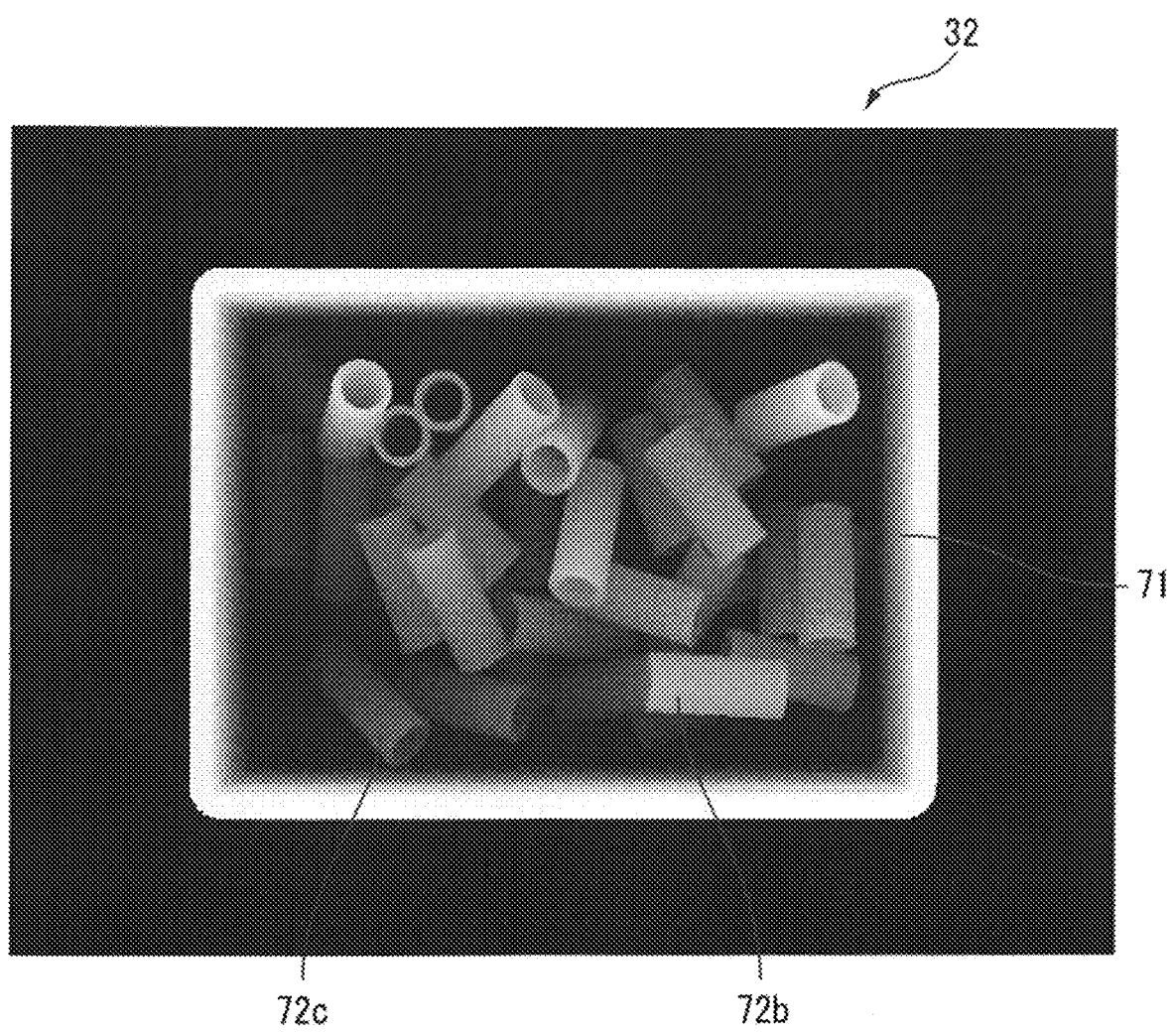
FIG. 8 illustrates a second distance image after the workpiece is taken out.

FIG. 8 shows an example of a distance image after the operation of lifting the target workpiece has been implemented. In the second distance image 32, the image 72a is no longer included, since the workpiece W corresponding to the image 72a in FIG. 7 has been taken out from the container 9.

Referring to FIG. 2, the operation setting unit 52 of the present embodiment includes a deletion unit 54 that deletes information about at least part of the measurement points in the three-dimensional information. The deletion unit 54 compares the position of the measurement point MP in the first three-dimensional information with the position of the measurement point MP in the second three-dimensional information. The deletion unit 54 detects, as a specified measurement point, the measurement point in the first three-dimensional information from which the measurement point in the second three-dimensional information is present within a predetermined distance range. The deletion unit 54 generates third three-dimensional information in which the information about the specified measurement point is deleted from the first three-dimensional information.

Figure 9:
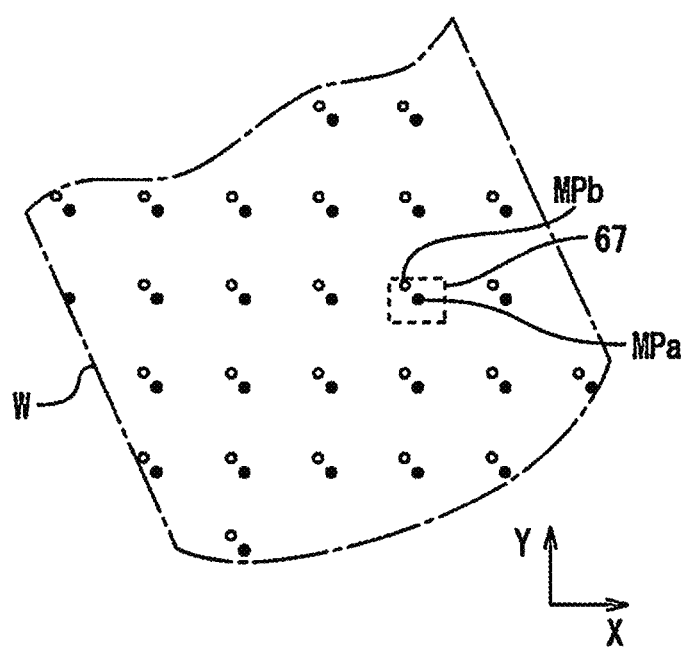
FIG. 9 is a diagram illustrating specified measurement points to be deleted from the first distance image.

FIG. 9 is a schematic view illustrating the measurement point in the first three-dimensional information generated before the workpiece is gripped and the measurement points in the second three-dimensional information generated after the operation of lifting the workpiece has been implemented. In the example illustrated in FIG. 9, the workpiece W different from the target workpiece is illustrated. Specifically, in the container 9, a workpiece in which the position after the target workpiece is lifted is unchanged from the position before the target workpiece is lifted is illustrated.

If the workpieces remaining in the container 9 do not move when the robot 1 implements the operation of lifting the workpiece W, the positions of measurement points MPa included in the first three-dimensional information match the positions of measurement point MPb included in the second three-dimensional information. Even in such a situation, the positions of measurement points MPa may be slightly different from the positions of measurement point MPb due to a measurement error and the like. Furthermore, slight movements of the remaining workpieces in the container 9 as result of the operation of lifting the target workpiece by the robot 1 may not affect a next step of taking out the next workpiece.

When the measurement point MPb included in the second three-dimensional information is present in the vicinity of the measurement point MPa included in the first three-dimensional information, the deletion unit 54 of the present embodiment sets the measurement point MPa to be the specified measurement point. Then, the deletion unit 54 generates the third three-dimensional information in which the information about the specified measurement point is deleted from the first three-dimensional information.

The determination range for deleting the measurement point MPa included in the first three-dimensional information is determined in advance. In the present embodiment, the determination range in the X axis direction, the Y axis direction, and the Z axis direction in the reference coordinate system is determined. In the example illustrated in FIG. 9, a determination range 67 relating to the X axis direction and the Y axis direction is illustrated. The measurement point MPb included in the second three-dimensional information is present in the determination range 67 with respect to the measurement point MPa included in the first three-dimensional information. Thus, the deletion unit 54 detects the measurement point MPa as the specified measurement point. The deletion unit 54 deletes the specified measurement point from the first three-dimensional information. For example, the coordinate value of the measurement point MPa included in the first distance image 31 is deleted. In this manner, the deletion unit 54 generates the third three-dimensional information in which the specified measurement point is deleted from the first three-dimensional information.

In the example illustrated in FIG. 9, the measurement points MPb included in the second three-dimensional information are present in the vicinity of all of the measurement points MPa included in the first three-dimensional information. Thus, the deletion unit 54 designates all the measurement points MPa to be the specified measurement points, and deletes the measurement points MPa from the first distance image.

Figure 10:
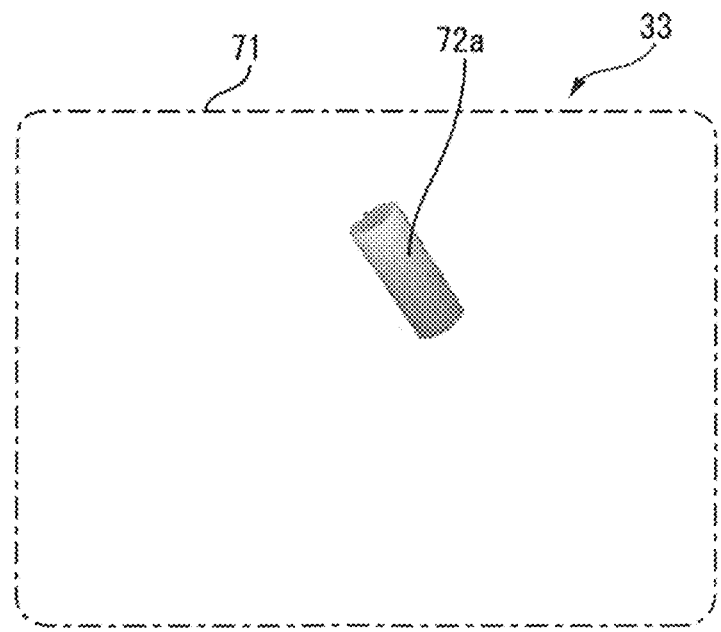
FIG. 10 illustrates a third distance image generated by deleting information about the specified measurement points from the first distance image.

FIG. 10 shows an example of a third distance image generated by a deletion unit. Referring to FIG. 7, FIG. 8, and FIG. 10, in the third distance image 33 serving as the third three-dimensional information, the images 72*b* and 72*c* of the plurality of workpieces in which the positions and the orientations are not changed are deleted from the first distance image 31. In the third distance image 33, the image 72*a* of the workpiece taken out from the container 9 by the robot 1 remains.

The detection unit 53 implements model matching in which the third distance image 33 and the three-dimensional shape data 46 are compared with each other, whereby the position and the orientation of the workpiece W corresponding to the image 72*a* is detected.

Next, the determination unit 55 determines whether or not the workpiece W detected by the detection unit 53 match the target workpiece W. The determination unit 55 acquires the position and the orientation of the target workpiece W from the selection unit 59. The determination unit 55 determines that the workpiece included in the third distance image 33 matches the target workpiece in a case where a difference between the position and the orientation of the workpiece W included in the third distance image 33 and the position and the orientation of the target workpiece is within a predetermined determination range. When the detection unit 53 detects a plurality of workpieces and a workpiece different from the target workpiece is included, the determination unit 55 determines that the workpiece included in the third three-dimensional information does not match the target workpiece.

In the example illustrated in FIG. 10, the determination unit 55 determines that the target workpiece W is taken out. Next, the determination unit 55 sends a command for conveying the workpiece W gripped by the hand 2 to the predetermined conveyance destination position, to the operation control unit 43. The operation control unit 43 controls the robot 1 so as to convey the workpiece W gripped by the hand 2 to the conveyance destination position.

In this manner, in the robot system 5 according to the present embodiment, it can be determined whether or not the hand 2 grips the target workpiece through the comparison between the first three-dimensional information before the operation of lifting the workpiece and the second three-dimensional information after the operation of lifting the workpiece.

If the hand 2 grips a single workpiece W different from the target workpiece W when the robot implements the operation of lifting the target workpiece W, the information about the workpiece different from the target workpiece W remains in the third three-dimensional information. The detection unit 53 detects the position and the orientation of the workpiece different from the target workpiece. The determination unit 55 determines that the workpiece detected by the detection unit 53 is different from the target workpiece. Furthermore, the hand 2 may grip the target workpiece together with a workpiece other than the target workpiece. In other words, the hand 2 may grip two or more workpieces W. In such a case, the third three-dimensional information includes information about a plurality of workpieces W. The detection unit 53 detects the positions and the orientations of the plurality of workpieces W. The determination unit 55 determines that the plurality of workpieces W detected by the detection unit 53 do not match the target workpiece.

When the hand 2 grips a workpiece different from the target workpiece or grips two or more workpieces, the determination unit 55 sends a command for returning the workpiece(s) W gripped by the hand 2 to the vicinity of the original position(s), to the operation control unit 43. The operation control unit 43 controls to robot 1 so as to return the workpiece(s) gripped by the hand 2 to the vicinity of the original position(s) before being gripped by the hand 2. In other words, the operation control unit 43 implements the control for returning the workpiece W to the vicinity of the position of the target workpiece in the first three-dimensional information.

After the robot 1 returns the workpiece W to the vicinity of the original position, the control for conveying the workpiece W is implemented from the step of capturing the image of the workpieces W. Specifically, the range sensor 6 captures an image of the workpieces W arranged in the container 9, the detection unit 53 detects the positions and the orientations of the workpieces W, and the selection unit 59 selects the next target workpiece W to be taken out by the robot 1. Then, the controller 4 implements control similar to that described above in order to take out the next target workpiece W.

When the workpiece W is returned into the container 9, control may be implemented so that the workpiece W gripped by the hand 2 is returned to a position different from the original position. However, this control has a possibility of causing load collapse in the container 9. BY adopting the control for returning the workpiece W gripped by the hand 2 to the vicinity of the original position, a possibility of the load collapse as a result of returning the workpiece W can be reduced. Note that the control for returning the workpiece W gripped by the hand 2 to the original position may be implemented.

The detection unit 53 may fail to detect the position and the orientation of the workpiece W in the third three-dimensional information. In other words, even when the model matching in which the third three-dimensional information and the three-dimensional shape data 46 are compared with each other is performed, the position and the orientation of the workpiece W in the third distance image 33 illustrated in FIG. 10 may not be detected. For example, the hand 2 may fail to grip the workpiece W and thus may not grip the workpiece W. Furthermore, when the operation of lifting the target workpiece W by the robot 1 is performed, the load collapse of the workpieces W do not occur in the container 9, and thus the positions and the orientations of all the workpieces W may remain to be the same. Alternatively, the amount of movement of the position of the workpiece W may be extremely small, and thus the information about the measurement point may be deleted by the deletion unit 54. In such a case, the third distance image 33 includes no image of the workpiece, and thus the detection unit 53 cannot detect any workpiece.

The determination unit 55 can detect the number of measurement points other than the specified measurement points, among the measurement points in the first three-dimensional information. The determination unit 55 can determine that the hand 2 does not grip the workpiece W in a case where the number of the measurement points other than the specified measurement points is smaller than a predetermined determination value related to the failure in the gripping. In other words, when almost all the measurement points are deleted by the deletion unit 54, the determination unit 55 can determine that the positions and the orientations of all the workpieces W arranged in the container 9 do not change. The determination unit 55 can determine that the workpieces W do not collapse as a result of the operation of taking out the workpiece W. A small value may be employed as the determination value related to the failure to grip the workpiece. For example, a value smaller than the lower limit of the number of measurement points set to a single workpiece can be employed.

After the determination unit 55 determines that the hand 2 grips no workpiece W, the controller 4 implements the control for conveying the workpiece W from the operation for capturing the image of the workpiece W. In other words, the range sensor 6 captures an image of the workpieces W arranged in the container 9, the detection unit 53 detects the positions and the orientations of the workpieces W, and the selection unit 59 selects the next target workpiece W to be taken out by the robot 1. Then, the controller 4 implements control similar to that described above in order to take out the next target workpiece W.

When the operation for taking out the workpiece W by the robot 1 is performed, the load collapse may occur. In other words, the positions and the orientations of the workpieces W that have not been taken out by the robot 1 may change. When the load collapse occurs, the second three-dimensional information includes many measurement points largely deviated from the measurement points in the first three-dimensional information. Thus, in the first three-dimensional information, the number of the specified measurement points arranged within the predetermined distance range from the measurement points in the second three-dimensional information is reduced. Thus, the number of the specified measurement points included in the first three-dimensional information is reduced.

The determination unit 55 detects the number of measurement points other than the specified measurement point among the measurement points in the first three-dimensional information, in order to determine whether or not the load collapse has occurred. The determination unit 55 determines whether or not the number of measurement points other than the specified measurement points is larger than a predetermined determination value related to the load collapse. The determination unit 55 can determine that the load collapse has occurred when the number of measurement points other than the specified measurement points is larger than the determination value related to the load collapse. A value larger than the upper limit of the number of measurement points set to a single workpiece may be employed as the determination value related to the load collapse, for example.

Alternatively, the determination unit 55 may calculate the number of measurement points in the second three-dimensional information, which are arranged outside the predetermined distance range of the measurement points in the first three-dimensional information. When this number of measurement points is larger than the determination value related to the load collapse, the determination unit 55 may determine that the number of measurement points other than the specified measurement points among the measurement points in the first three-dimensional information is larger than the determination value related to the load collapse.

When it is determined that the number of measurement points other than the specified measurement points among the measurement points in the first three-dimensional information is larger than the determination value related to the load collapse, the determination unit 55 transmits a command for returning the workpiece W gripped by the hand 2 to the vicinity of the original position, to the operation control unit 43. The operation control unit 43 controls the robot 1 so as to return the workpiece W gripped by the hand 2 to the vicinity of the original position before being gripped by the hand 2.

After the robot 1 returns the workpiece W to the vicinity of the original position, the controller 4 implements the control for taking out the workpiece W from the operation for capturing the image of the workpiece W. In other words, the range sensor 6 captures an image of the workpieces W arranged in the container 9, the detection unit 53 detects the positions and the orientations of the workpieces W, and the selection unit 59 selects the next target workpiece W to be taken out by the robot 1. Then, the controller 4 implements control similar to that described above in order to take out the next target workpiece W.

The robot system 5 of the present embodiment determines a state where the workpiece W is being gripped, when the robot 1 implements an operation of lifting the workpiece W. The robot 1 can be controlled in accordance with the state of the workpiece W being gripped. Thus, the robot system 5 can achieve a shorter cycle time for conveying the workpiece W. For example, the robot 1 can be prevented from implementing the operation of conveying the workpiece W to the target conveyance destination position, in a state where the workpiece W is not actually gripped. Alternatively, when the hand 2 grips the workpiece W other than the target workpiece or grips the target workpiece W and another workpiece W, the workpiece(s) W can be prevented from being conveyed to the target conveyance destination position. For example, the robot 1 can be prevented from implementing an operation of returning the workpiece(s) to the original position after the workpiece other than the target workpiece or two or more workpieces is (are) conveyed to the target conveyance destination position.

Figure 11:
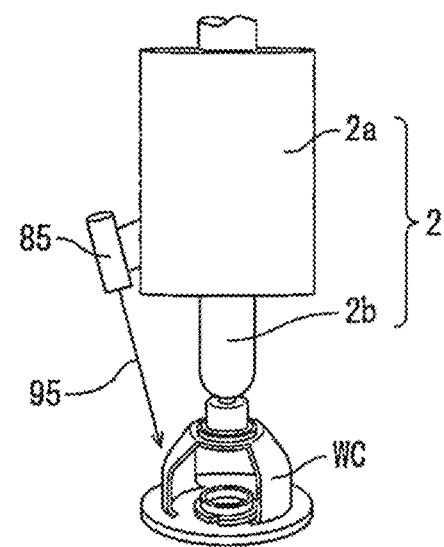
FIG. 11 is a first side view of a hand, a workpiece, and a photoelectric sensor of a first comparative example.

FIG. 11 shows a first side view of a part of the hand in a robot system according to a first comparative example. In the first comparative example, a photoelectric sensor 85 is provided in order to determine whether or not the hand 2 grips the workpiece WC. The photoelectric sensor 85 is fixed to the hand 2. The photoelectric sensor 85 emits light as indicated by an arrow 95. It is determined that the hand 2 grips the workpiece WC when the photoelectric sensor 85 detects light reflected from the surface of the workpiece WC. It is determined that the hand 2 does not grip the workpiece WC when the photoelectric sensor 85 does not detect the reflected light.

Figure 12:
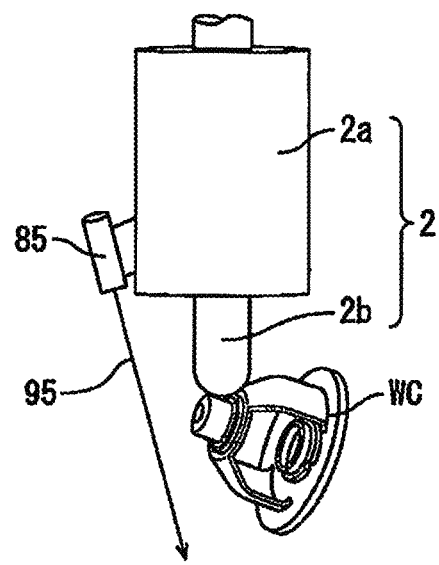
FIG. 12 is a second side view of the hand, the workpiece, and the photoelectric sensor of the first comparative example.

FIG. 12 is a second side view of a part of the hand in the robot system of the first comparative example. The hand 2 of the comparative example is an electromagnet hand. Thus, the workpiece WC can be in any orientation to be gripped. As illustrated in FIG. 12, the photoelectric sensor 85 cannot receive the reflected light in a case where the workpiece WC is gripped while being inclined. Thus, the workpiece WC may be determined to be not gripped, despite the fact that the workpiece WC is actually gripped. The first comparative example has a problem that the orientation of the photoelectric sensor 85 is difficult to set since the photoelectric sensor 85 is fixed to the hand 2. Alternatively, the photoelectric sensor 85 may not be arranged in the orientation in which the workpieces WC gripped in various orientations can be detected.

Figure 13:
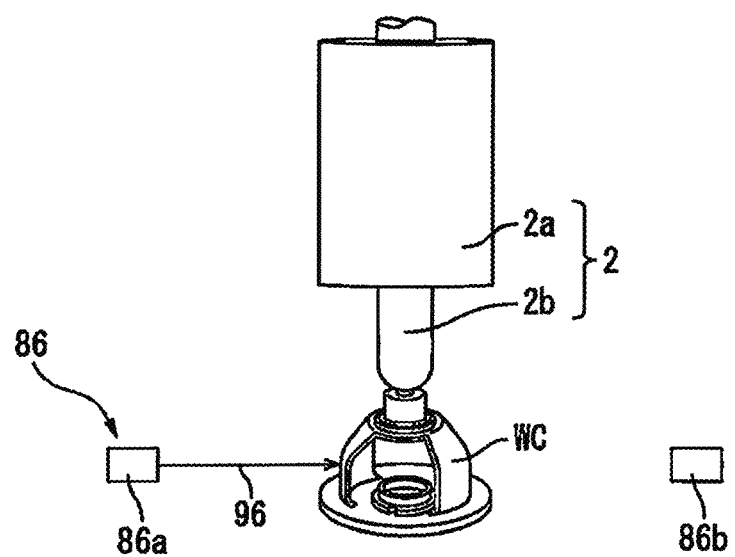
FIG. 13 is a first side view of a hand, a workpiece, and a photoelectric sensor of a second comparative example.

FIG. 13 is a first side view of a part of the hand in a robot system of a second comparative example. In the second comparative example, a photoelectric sensor 86 is provided in order to determine whether or not the hand 2 grips the workpiece WC. The photoelectric sensor 86 includes a light emitting element 86a and a light receiving element 86b. The light emitting element 86a and the light receiving element 86b can be fixed to a support member and the like for example. The position and the orientation of the robot 1 can be controlled so as to place the workpiece WC between the light emitting element 86a and the light receiving element 86b. The light emitting element 86a emits light as indicated by the arrow 96. It can be determined that the hand 2 grips the workpiece WC when the light receiving element 86b does not receive the light.

Figure 14:
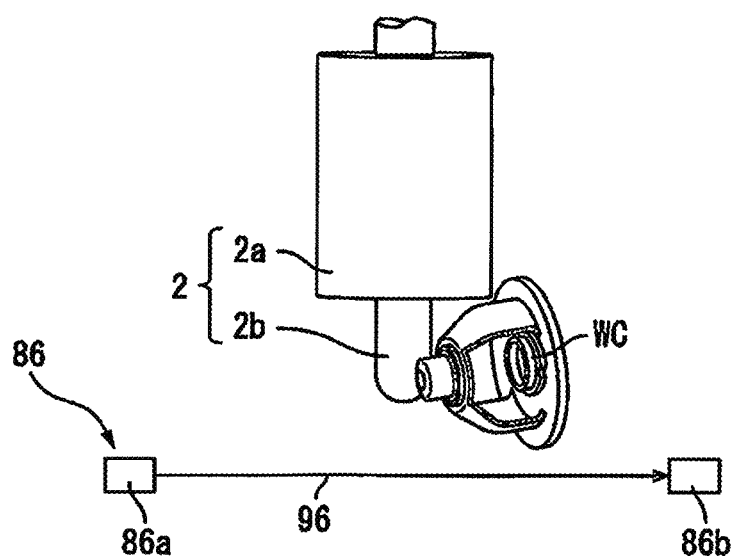
FIG. 14 is a second side view of the hand, the workpiece, and the photoelectric sensor of the second comparative example.

FIG. 14 is a second side view of a part of the hand in the robot system according to the second comparative example. As illustrated in FIG. 14, the light emitted from the light emitting element 86a may reach the light receiving element 86b when the workpiece WC is gripped by the hand 2 in an orientation different from the desired orientation. Thus, the workpiece WC may be determined to be not gripped, despite the fact that the workpiece WC is actually gripped.

Figure 15:
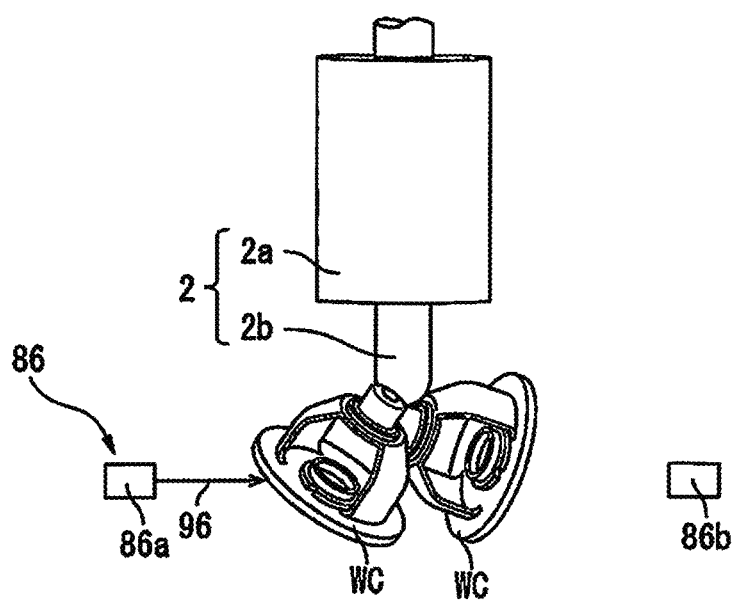
FIG. 15 illustrates a third side view of a hand, a workpiece, and a photoelectric sensor of the second comparative example.

FIG. 15 is a third side view of a part of the hand in the robot system of the second comparative example. As illustrated in FIG. 15, the hand 2 may grip two or more workpieces WC. In such a case, the light emitted from the light emitting element 86a can be blocked by the workpiece WC. However, with this control, a state where the plurality of workpieces WC are gripped cannot be detected. Referring to FIG. 11 and FIG. 12, the state where the plurality of workpieces WC are gripped cannot be detected also in the first comparative example.

Thus, the method of determining the state where a workpiece is gripped by using the photoelectric sensor may fail to accurately determine the state where the hand grips the workpiece. On the other hand, the robot system 5 according to the present embodiment can accurately determine the state in which the workpiece W is gripped by the hand 2. The workpiece W can be detected regardless of the orientation of the workpiece W gripped by the hand 2. Alternatively, the state where two or more workpieces W are gripped can be detected. Thus, the robot 1 can be prevented from being excessively operated.

In the second comparative example, the workpiece can be detected by moving the hand to a plurality of positions and the orientations in consideration of the plurality of states where the workpiece is gripped. However, this control disadvantageously leads to a long cycle time. The robot system 5 of the present embodiment can detect the state where the workpiece is gripped through the comparison between the first three-dimensional information and the second three-dimensional information, and thus can detect the state where the workpiece is gripped in a short period of time.

Furthermore, the robot system 5 of the present embodiment requires no device for detecting the state where the workpiece is gripped, such as a photoelectric sensor. The robot system 5 can detect the state where the workpiece is gripped by using an output from the three-dimensional sensor for detecting the position and the orientation of the workpiece. As described above, the robot system 5 of the present embodiment can accurately confirm the state where the workpiece W is gripped with a simple configuration.

Figure 16:
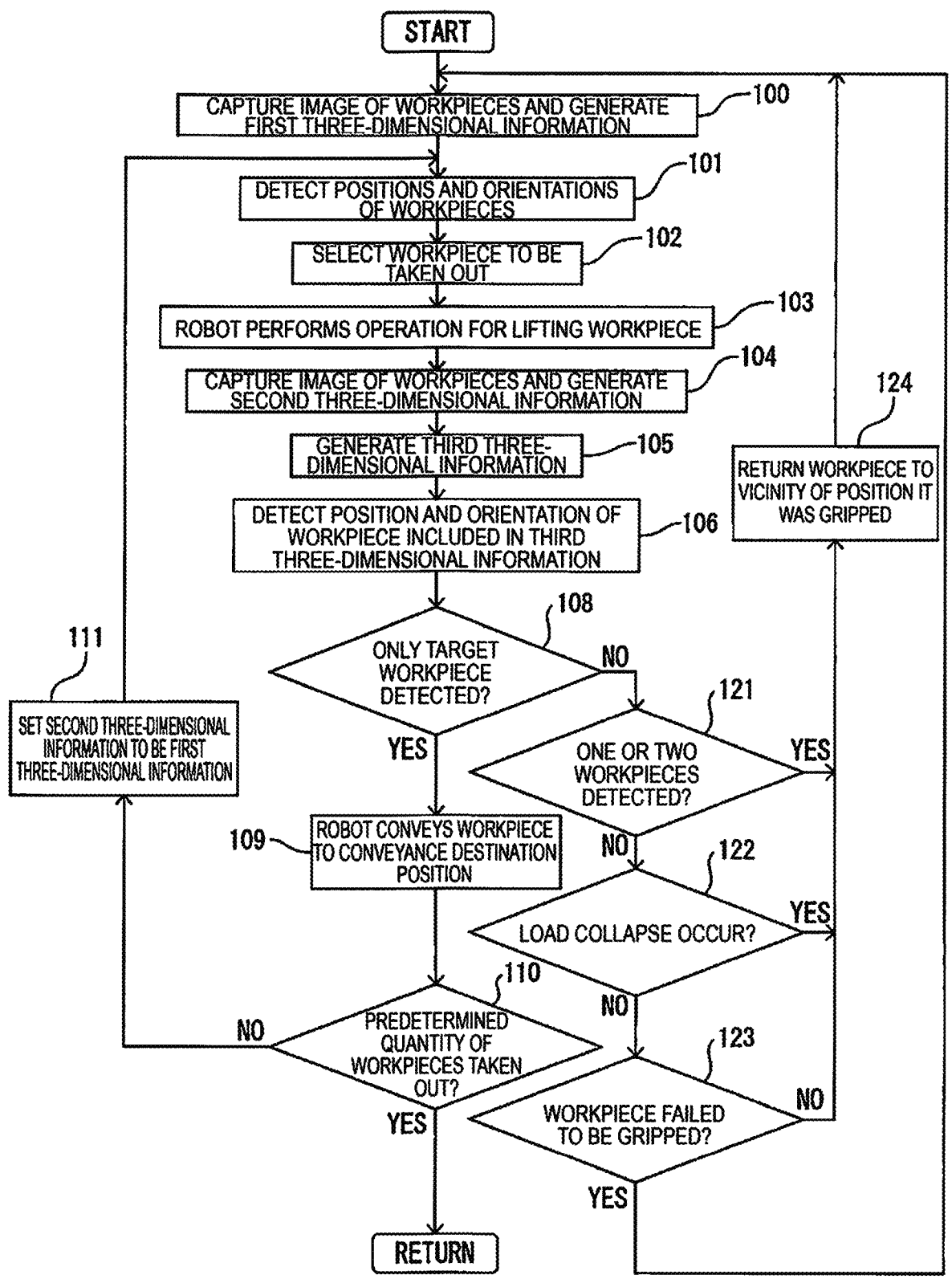
FIG. 16 is a flowchart of a control in the embodiment.

FIG. 16 is a flowchart illustrating a method of controlling the robot system of the present embodiment. The control illustrated in FIG. 16 can be repeatedly implemented.

Referring to FIG. 2 and FIG. 16, in step 100, the operation control unit 43 implements a first image capturing step for capturing an image of the workpieces W with the range sensor 6. The generation unit 58 implements a first generation step including setting measurement points on the workpieces W based on an output from the range sensor 6, and generating the first three-dimensional information including the coordinate values of the measurement points. The generation unit 58 generates the first three-dimensional information based on the output from the range sensor 6 that captured the image of the workpieces W before the robot 1 implements the operation of gripping the target workpiece W.

In step 101, the detection unit 53 implements a first detection step of detecting the positions and the orientations of the workpieces W, by implementing the model matching of comparing the first three-dimensional information of the workpieces with the predetermined three-dimensional shape data 46 of the workpiece W.

In step 102, the selection unit 59 implements a selection step of selecting a target workpiece to be taken out by the robot 1, based on the positions and the orientations of the workpieces W detected by the detection unit 53.

In step 103, the operation control unit 43 implements an operation control step of changing the position and the orientation of the robot 1. In this operation control step, the robot 1 implements an operation of gripping and lifting the target workpiece W. Then, the robot 1 stops in a state where the workpiece W is arranged in the vicinity of the container 9.

In step 104, the range sensor 6 implements a second image capturing step of capturing the image of the workpieces W. The generation unit 58 implements a second generation step of generating the second three-dimensional information based on the output from the range sensor 6 that captured the image of the workpieces W after the robot 1 implements the operation of lifting the target workpiece W.

In step 105, the deletion unit 54 implements a deletion step of deleting the information about at least a part of the measurement points included in the first three-dimensional information. The deletion unit 54 implements a step of comparing the positions of the measurement points in the first three-dimensional information with the positions of the measurement points in the second three-dimensional information. The deletion unit 54 determines whether or not the measurement point in the second three-dimensional information is present within the predetermined distance from each of the measurement points in the first three-dimensional information. The deletion unit 54 implements a step of detecting, as the specified measurement point, the measurement point in the first three-dimensional information from which the measurement point in the second three-dimensional information is present within the predetermined distance range. The deletion unit 54 implements a step of generating the third three-dimensional information in which the information about the coordinate value and the like of the specified measurement point is deleted from the first three-dimensional information.

In step 106, the detection unit 53 implements a second detection step of detecting the position and the orientation of the workpiece included in the third three-dimensional information after the processing in the deletion step. The detection unit 53 implements model matching in which the third three-dimensional information about the workpiece is compared with the predetermined three-dimensional shape data 46 of the workpiece. The detection unit 53 detects the positions and the orientations of all the workpieces W in the third three-dimensional information.

In step 108, the determination unit 55 implements a determination step of determining the state after the operation of lifting the workpiece W by the robot. In the determination step, it is determined whether or not the workpiece W detected in the second detection step matches the target workpiece W. Here, the determination unit 55 determines whether or not only the target workpiece W is taken out. When the workpiece W taken out does not match the target workpiece W in step 108, the control proceeds to step 121. For example, the control proceeds to step 121 when the workpiece W lifted by the robot 1 is different from the target workpiece W, or when two or more workpieces W are lifted.

When it is determined that only the target workpiece W is taken out in step 108, the control proceeds to step 109. In step 109, an operation control step is implemented. In this operation control step, the operation control unit 43 controls the robot 1 so as to convey the workpiece W gripped by the hand 2 to the predetermined conveyance destination position.

Next, in step 110, the determination unit 55 determines whether or not a predetermined number of workpieces are taken out. In other words, it is determined whether or not the quantity of workpieces taken out reaches a determination value for such a quantity. This determination value for the quantity can be set in advance by the operator. For example, the operator can set a small quantity such as five, as the determination value. Alternatively, the operator may set the quantity corresponding to all the workpieces W accommodated in the container 9, as the determination value.

When the predetermined quantity of workpieces W are taken out in step 110, the control is terminated. When the predetermined quantity of workpieces W are not taken out in step 110, the control proceeds to step 111. In step 111, the generation unit 58 sets the current second three-dimensional information to be the first three-dimensional information. In other words, the three-dimensional information as a result of taking out the workpiece W is set to be the first three-dimensional information. In this control, only the target workpiece is detected in step 108. It can be determined that the load collapse does not occur in the workpieces W remaining in the container 9. Thus, the second three-dimensional information generated after the target workpiece W is taken out can be used as the first three-dimensional information.

Then, the control proceeds to step 101 and the control for taking out the workpiece W is implemented. In step 101, the detection unit 53 detects the positions and the orientations of the workpieces W based on the first three-dimensional information. In step 102, the selection unit 59 selects the next target workpiece W. In this control, step 100 is omitted. The step of acquiring the three-dimensional information by capturing an image of the workpieces with a three-dimensional camera can be omitted. Thus, the cycle time can be shortened.

When the workpiece W taken out by the robot 1 does not match the target workpiece W in step 108, the control proceeds to step 121. In step 121, the determination unit 55 implements a determination step of determining whether or not a single workpiece is detected. The determination unit 55 determines whether or not the hand 2 grips a single workpiece different from the target workpiece. The determination unit 55 determines whether or not the third three-dimensional information includes two workpieces. In other words, it is determined whether or not the hand 2 grips two workpieces. When one or two workpieces are detected in step 121, the control proceeds to step 124.

In step 121, it may be determined whether or not two or more workpieces are detected instead of determining whether or not two workpieces are detected.

In step 124, the determination unit 55 sends a command for retuning the workpiece W gripped by the hand 2 to the vicinity of the original position at which the workpiece W was placed before being gripped by the hand 2, to the operation control unit 43. The operation control unit 43 controls the robot 1 so as to return the workpiece W to the vicinity of the original position. Then, the control proceeds to step 100. After the robot 1 returns the workpiece W to the vicinity of the original position, the control for taking out a workpiece is implemented from the first image capturing step. In step 100, the range sensor 6 implements an image capturing step of capturing an image of a workpieces W. In step 102, the detection step of detecting the positions and the orientations of the workpieces is implemented. In step 103, the selection step of selecting the next target workpiece W to be taken out by the robot 1 is implemented. Then, the control similar to that described above is implemented.

When one or two workpieces are not detected in step 121, the control proceeds to step 122. In step 122, the determination unit 55 implements the determination step of determining whether or not the load collapse has occurred. In this determination step, it is determined whether or not the number of the measurement points in the first three-dimensional information other than the specified measurement point is larger than the determination value related to the load collapse. The determination unit 55 determines that the load collapse has occurred when the number of the measurement points other than the specified measurement point is larger than the determination value related to the load collapse. In this case, the control proceeds to step 124.

In step 122, the determination unit 55 can determine that the load collapse does not occur when the number of the measurement points other than the specified measurement point is equal to or smaller than the determination value related to the load collapse. In this case, the control proceeds to step 123.

In step 123, the determination unit 55 determines whether or not the hand 2 fails to grip the workpiece W. The determination unit 55 implements a determination step of determining whether or not the number of the measurement points in the first three-dimensional information other than the specified measurement point is smaller than a determination value related to failure in the gripping. The determination unit 55 determines that the hand 2 fails to grip the workpiece W, in a case where the number of the measurement points other than the specified measurement point is smaller than the determination value related to failure in the gripping. In this case, the control returns to step 100. The control is implemented from the first image capturing step of capturing the image of the workpieces W. When it is determined that the hand 2 successfully grips the workpiece W in step 123, the control proceeds to step 124.

In the control illustrated in FIG. 16, the control for taking out the workpiece is implemented until the predetermined number of workpieces are taken out as illustrated in step 110, but the embodiment is not limited to this. The control may be terminated when all the workpieces W arranged in the container 9 are taken out. For example, the control may be terminated when no workpiece arranged in the case is detected in step 101.

The three-dimensional sensor of the present embodiment includes the two two-dimensional cameras, but the embodiment is not limited to this. The three-dimensional sensor may include three or more two-dimensional cameras. By adopting this configuration where the three-dimensional sensor includes three or more cameras, even when part of the images is unclear due to halation and the like, the three-dimensional information can be generated based on images captured by other cameras. The three-dimensional sensor of the present embodiment includes the projector, but the projector may not be provided. Furthermore, the three-dimensional sensor may include any appropriate sensor that can acquire information about a distance to a workpiece. For example, the three-dimensional sensor may be a Time of Flight (TOF) camera that captures a distance image by using the time of flight method.

The range sensor 6 of the present embodiment is fixed to the support member 83, but the embodiment is not limited to this, and can be arranged so as to be capable of capturing an image of workpieces. For example, the range sensor may be fixed to the wrist of the robot so as to integrally move with the wrist.

The hand 2 of the present embodiment is a magnetic hand, but the embodiment is not limited to this. Any operation tool for gripping and releasing a workpiece can be employed as the hand. For example, a hand that has a plurality of craws, and grips a workpiece with the craws clamping the workpiece, a hand that grips a workpiece with a suction pad with air in the suction pad sucked, or the like can be employed.

According to the robot system and the control method of the robot system of the aspect of the present disclosure, the state where the hand grips a workpiece can be accurately determined when workpieces loaded in bulk are taken out.

In each control described above, the sequence of steps may be changed as appropriate, within such a range that the functionality and operation are not changed.

The above-described embodiments can be combined as appropriate. Identical or equivalent parts are given identical reference numerals in the above-described drawings. Note that the above-described embodiments are merely examples and are not intended to limit the invention. Changes to the embodiments as indicated in the claims are also included in the embodiments.

The invention claimed is:

1. A robot system that takes out each of workpieces loaded in bulk inside a case, the robot system comprising:
a hand that grips a workpiece,
a robot that moves the hand,
a three-dimensional sensor that acquires information about distances to the workpieces, and
a controller that controls the hand and the robot, wherein the controller includes:
an operation control unit that sends operation commands to the hand and the robot;
a generation unit that generates three-dimensional information including information about positions of measurement points set to the workpieces based on an output from the three-dimensional sensor;
a storage unit that stores three-dimensional shape data of the workpieces;
a detection unit that detects positions and orientations of the workpieces by implementing model matching in which the three-dimensional information about the workpieces is compared with the three-dimensional shape data;
a selection unit that selects a target workpiece to be taken out by the robot based on the positions and the orientations of the workpieces;
a deletion unit that deletes information about at least part of the measurement points included in the three-dimensional information; and
a determination unit that determines a state after the robot implements an operation of lifting the workpiece,
the generation unit generates first three-dimensional information based on an output from the three-dimensional sensor that has captured an image of the workpieces before the robot implements an operation of gripping the target workpiece,
the operation control unit controls the robot so as to stop after implementing an operation of gripping and lifting the target workpiece selected based on the first three-dimensional information,
the generation unit generates second three-dimensional information based on an output from the three-dimensional sensor that has captured an image of the workpieces after the robot implements the operation of lifting the target workpiece,
the deletion unit compares a position of the measurement point in the first three-dimensional information with a position of the measurement point in the second three-dimensional information, detects, as a specified measurement point, the measurement point in the first three-dimensional information from which the measurement point in the second three-dimensional information is present within a predetermined distance range, and generates third three-dimensional information in which information about the specified measurement point is deleted from the first three-dimensional information, the detection unit detects a position and an orientation of a workpiece included in the third three-dimensional information, the determination unit determines whether or not the workpiece included in the third three-dimensional information matches the target workpiece, and when the workpiece included in the third three-dimensional information matches the target workpiece, the operation control unit controls the robot so as to convey the workpiece gripped by the hand to a predetermined conveyance destination position.

2. The robot system according to claim 1, wherein the operation control unit controls the robot so as to return the workpiece gripped by the hand to a vicinity of an original position of the workpiece before being gripped by the hand, when the determination unit determines that the workpiece included in the third three-dimensional information is different from the target workpiece or that two or more workpieces are included in the third three-dimensional information, and after the robot returns the workpiece to the vicinity of the original position, the three-dimensional sensor captures an image of the workpieces arranged in the case, the detection unit detects positions and orientations of the workpieces, and the selection unit selects a next target workpiece to be taken out by the robot.

3. The robot system according to claim 1, wherein the determination unit determines whether or not number of measurement points in the first three-dimensional information other than specified measurement points is larger than a predetermined determination value related to load collapse, when the determination unit determines that the number of measurement points other than specified measurement points is larger than the determination value related to the load collapse, the operation control unit controls the robot so as to return the workpiece gripped by the hand to the vicinity of the original position of the workpiece before being gripped by the hand, and after the robot returns the workpiece to the vicinity of the original position, the three-dimensional sensor captures an image of the workpieces arranged in the case, the detection unit detects positions and orientations of the workpieces, and the selection unit selects a next target workpiece to be taken out by the robot.

4. The robot system according to claim 1, wherein the determination unit determines whether or not number of measurement points in the first three-dimensional information other than specified measurement points is smaller than a predetermined determination value related to failure in gripping, and when the determination unit determines that the number of measurement points other than specified measurement points is smaller than the determination value related to the failure in the gripping, the three-dimensional sensor captures an image of the workpieces arranged in the case, the detection unit detects positions and orientations of the workpieces, and the selection unit selects a next target workpiece to be taken out by the robot.

5. A control method of a robot system that includes a robot and a hand and takes out each of workpieces loaded in bulk in a case, the method comprising:

an operation control step of changing a position and an orientation of the robot;

an image capturing step of capturing an image of the workpieces with a three-dimensional sensor that acquires information about distances to the workpieces;

a generation step of generating three-dimensional information including information about positions of measurement points set to the workpieces based on an output from the three-dimensional sensor;

a detection step of detecting the positions and the orientations of the workpieces by implementing model matching in which the three-dimensional information about the workpieces is compared with three-dimensional shape data of the workpieces;

a selection step of selecting a target workpiece to be taken out by the robot based on the positions and the orientations of the workpieces;

a deletion step of deleting information about at least part of the measurement points included in the three-dimensional information; and a determination step of determining a state after the robot implements an operation of lifting the workpiece, wherein the generation step includes generating first three-dimensional information based on an output from the three-dimensional sensor that has captured an image of the workpiece before the robot implements an operation of gripping the target workpiece, the operation control step includes a step of controlling the robot so as to stop after implementing an operation of gripping and lifting the target workpiece selected based on the first three-dimensional information, the generation step includes generating second three-dimensional information based on an output from the three-dimensional sensor that has captured an image of the workpieces after the robot has implemented the operation of lifting the target workpiece, the deletion step includes a step of comparing a position of the measurement point in the first three-dimensional information with a position of the measurement point in the second three-dimensional information, a step of detecting, as a specified measurement point, the measurement point in the first three-dimensional information from which the measurement point in the second three-dimensional information is present within a predetermined distance range, and a step of generating third three-dimensional information in which information about the specified measurement point is deleted from the first three-dimensional information, the detection step includes a step of detecting a position and an orientation of a workpiece included in the third three-dimensional information, the determination step includes a step of determining whether or not the workpiece included in the third three-dimensional information matches the target workpiece, and the operation control step includes a step of controlling, when the workpiece included in the third three-dimensional information matches the target workpiece, the robot so as to convey the workpiece gripped by the hand to a predetermined conveyance destination position.

6. The control method of a robot system according to claim 5, wherein the robot is controlled to return the workpiece gripped by the hand to a vicinity of an original position of the workpiece before being gripped by the hand, in response to determining in the determination step that the workpiece included in the third three-dimensional information is different from the target workpiece or that two or more workpieces are included in the third three-dimensional information, and after the robot returns the workpiece to the vicinity of the original position, an image capturing step of capturing an image of the workpieces arranged in the case with the three-dimensional sensor is performed, a detection step of detecting positions and orientations of the workpieces is performed, and a selection step of selecting a next target workpiece to be taken out by the robot is performed.

7. The control method of a robot system according to claim 5, wherein the determination step includes determining whether or not number of measurement points in the first three-dimensional information other than specified measurement points is larger than a predetermined determination value related to load collapse, in response to determining that the number of measurement points other than specified measurement points is larger than the determination value related to the load collapse, the robot is controlled so as to return the workpiece gripped by the hand to the vicinity of the original position of the workpiece before being gripped by the hand, and after the robot returns the workpiece to the vicinity of the original position, an image capturing step of capturing an image of the workpieces arranged in the case with the three-dimensional sensor is performed, a detection step of detecting positions and orientations of the workpieces is performed, and a selection step of selecting a next target workpiece to be taken out by the robot is performed.

8. The control method of a robot system according to claim 5, wherein the determination step includes determining whether or not number of measurement points in the first three-dimensional information other than specified measurement points is smaller than a predetermined determination value related to failure in gripping, and in response to determining that the number of measurement points other than specified measurement points is smaller than the determination value related to the failure in the gripping, an image capturing step of capturing an image of the workpieces arranged in the case with the three-dimensional sensor is performed, a detection step of detecting positions and orientations of the workpieces is performed, and a selection step of selecting a next target workpiece to be taken out by the robot is performed.

* * * * *